June 7, 1960
L. PÉRAS
2,939,427
CONTROL DEVICE FOR FLUID-OPERATED
RECIPROCATING POWER APPARATUS
Filed Feb. 26, 1957
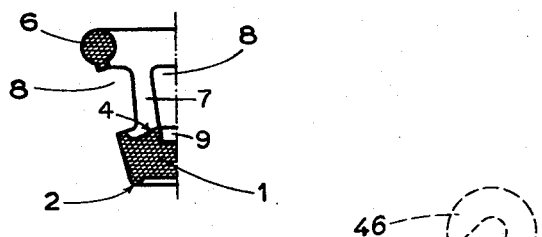
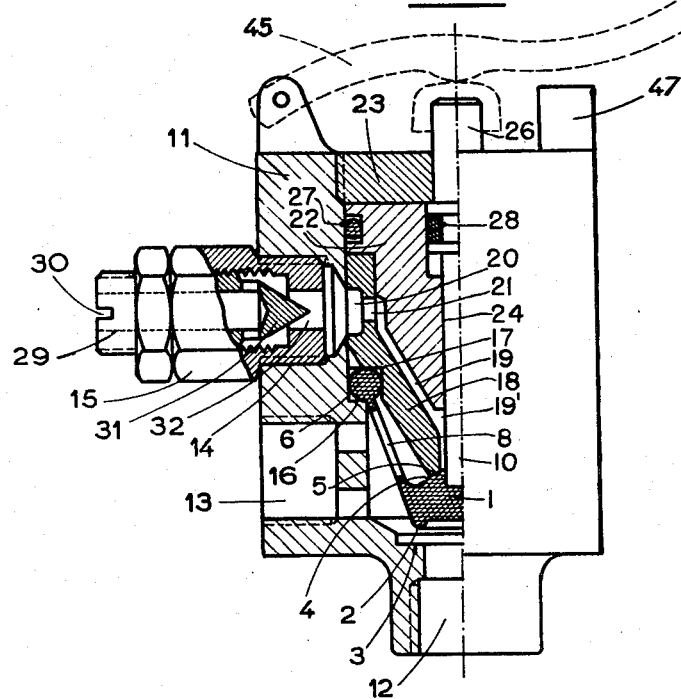
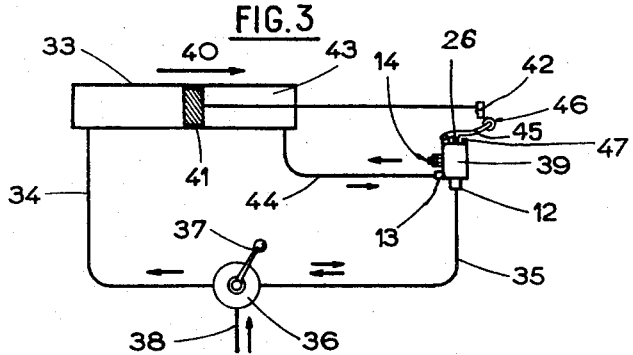

United States Patent Office 2,939,427
Patented June 7, 1960

2,939,427

CONTROL DEVICE FOR FLUID-OPERATED RECIPROCATING POWER APPARATUS

Lucien Péras, Billancourt, France, assignor to Regie Nationale des Usines Renault, Billancourt, France Filed Feb. 26, 1957, Ser. No. 642,575

Claims priority, application France Mar. 8, 1956

3 Claims. (Cl. 121—38)

The invention relates to a braking device for an apparatus operated by compressed air, whereby the movement of the apparatus can be braked at any point of its stroke and its speed thus adjusted to a predetermined value.

A pneumatic apparatus executes each stroke under the effect of the pressure of compressed air acting on the piston or on the driving member. A distributor causes one end of the cylinder to be fed with working medium while at the same time it connects the other end to the exhaust. The driving pressure is thus the difference between the pressures on either side of the piston.

In order that the piston and therefore the member controlled by the apparatus can be moved, the driving force created by the resultant pressure must be greater than the resistant force. When this condition is satisfied, movement takes place and continues until the end of the stroke, at a speed which depends on the driving force, the resistant force and the mass displaced.

Now, this speed can reach a dangerous value at the moment of stopping. The kinetic energy accumulated by the mass in movement connected to the jack is in fact abruptly liberated and a very violent impact may result, either of the piston against the end of the jack or of the mass itself against its abutment.

In order to obviate these disadvantages, it has been proposed to restrict the feed or discharge ducts in order to reduce the speed of the apparatus from the time of starting; the speed is in fact reduced, but the excessively slow starting is inadmissible.

The invention has as its object a method of operation consisting in closing the exhaust duct of the apparatus between the apparatus and the distributor at a predetermined instant, and to allow exhaust through a branch orifice whose free cross-sectional passage is regulated by any appropriate means, for example by means of a screw-threaded adjustable-passage needle valve.

The apparatus thus operates at normal speed up to the chosen point of its stroke and is then suddenly braked during all the rest of its stroke by the air which is compressed in the cylinder at the exhaust end, without producing any stress in the main distributor.

Operation of the braking device is brought about by a cam or abutment which is fixed on a movable part of the controlled apparatus at an appropriate point and acts temporarily on a push member with which the braking device is provided.

As soon as the apparatus arrives at its end of stroke and is fed by the distributor in such manner as to make the said apparatus carry out a stroke in the reverse direction, the braking device automatically allows through passage, and is once more ready to operate for the following cycle.

The braking device which is more particularly the subject of the invention is constituted essentially of a body comprising three pipes; the first, which is the inlet for the air from the distributor, ends in a seat which can be closed or opened by the valve member of a packing element made of elastic material, the second being the outlet pipe towards the jack. The third pipe, connected to the atmosphere carries a nipple containing a screw-threaded regulating needle valve, which nipple communicates with a central orifice and a seat which is normally closed by a rim of the packing element opposite the valve member controlling the seat of the first orifice. The packing element is made to bear against the central orifice by its elastic tension, its base being fixed in a groove in the body of the braking device.

The passage of air for feeding the apparatus flows freely in a direction from distributor to apparatus.

In the direction from apparatus to distributor i.e. towards the exhaust, the passage is also left free until the instant when the packing element bears on the seat of the first pipe, by means of the push member which projects outside the body of the braking device.

At this instant, the exhaust pressure which builds up behind the valve member owing to the apertures with which the packing element is provided, holds the latter hard against its seat. But, in this movement, it moves away from the seat against which it bore previously and opens the central orifice, which is placed in communication with the second orifice. The normal exhaust towards the distributor is thus closed and the air evacuated from the apparatus escapes through the orifice regulated by the needle valve. By this arrangement, a resistance is set up to the escape of the air, and the apparatus finishes its stroke at the desired reduced speed.

The features and advantages of the invention will be brought out more clearly in the following description which is given with reference to the accompanying drawings, wherein:

Fig. 1 is a vertical sectional view of the packing element provided in the braking device;

Fig. 2 is a view, half in vertical section and half in elevation, of the braking device;

Fig. 3 is a diagram of the feed and exhaust of a pneumatic apparatus, showing the arrangement of the braking device in the distribution circuit.

Referring now to the drawings and more particularly to Fig. 1, it will be seen that the packing element of plastic material comprises a solid body 1 which is cylindrical and forms a double valve member, with a bottom rim 2 constituting the first valve member and a support rim 4 forming the second valve member. The body 1 is connected to an upper toric bead 6 of the packing element by a frusto-conical portion 7 which is formed with apertures 8. A cavity or seat 9 is formed on the upper surface of the body 1 for a purpose which will be indicated hereinafter.

This packing element is intended to be arranged in the braking device proper, constituted by a hollow cylindrical body 11 which comprises the pipe 12 provided for feeding and the pipe 13 provided for exhaust from the apparatus being controlled, and also the pipe 14 for retarded discharge, in which is mounted the nipple 15 containing a screw 29 provided with the needle valve 31. The body 11 is formed with a seat 3 in its lower portion.

Arranged inside the body 11 are two frustro-conical rings 18 and 22 which are separated from one another by a certain interval, in such manner as to form between them a passage 19. The ring 18 by its lower edge forms a seat 5 and the ring 22 accommodates in its axial bore 24 the push rod 10 with external head 26. The push rod 10 leaves a free passage $19^1$ between its stem and the bore of the ring 18.

A peripheral circular groove 20 and apertures 21 in the ring 18 cause the central orifice $19^1$ and the passage 19 to communicate with the pipe 14. The lower end of the push rod 10 engages in the seat 9 of the elastic packing element. The toric rings 27 and 28 ensure that the ring 22 and the push rod 10 are fluid-tight in their mountings. The frusto-conical ring 22 is locked by the plug 23 of the body 11 against the upper end of the ring 18, which is thus held in position.

The plastic assembly forming a double valve member 2, 4, is arranged in the body 11 of the braking device as shown in Fig. 2. The sealing and securing toric bead 6 is mounted on the circular shoulder of the body 11 by the groove 17 of the ring 18.

The double valve member 1 is intended to engage with its rim 4 against the seat 5 of the ring 18, and with its lower rim 2 against the seat 3 in the body 11.

The nipple 15 which carries the threaded needle valve and which is screwed into the pipe 14 is of a known type. 29 is the needle valve, which is operated by means of a screw-driver engaged in the slot 30, the needle valve 31 reducing the cross-section of the orifice 32.

The packing element is normally made to bear against its seat 5 by its own elastic tension.

In Fig. 3, 33 is the apparatus which is being controlled: for example a pneumatic jack, to which working fluid is fed through the conduits 34 and 35 issuing from the distributor 36, which is operated by the handle 37. 38 is the conduit whereby compressed air arrives at the distributor.

Arranged in this way, the distribution system allows the jack to operate without any movement regulation; the speed of the piston, its rod and the member which is shifted is therefore not controlled.

If, on the contrary, the braking device according to the invention is interposed at 39 for example, it will be possible to regulate the speed of movement of the piston in the direction of the arrow 40, the braking action commencing at the chosen point.

In the case of Fig. 3, this point is that corresponding to the position 41 of the piston.

The push member 26 of the braking device is driven inwardly by the cam 42 carried by the rod of the jack, acting on the roller 46 of the lever 45 of the braking device. A stop 47 limits the movement of the lever 45 in order to avoid crushing the push member 26. Direct action of the cam of the push member would entail the risk of deforming and then jamming the said push member.

The braking device operates in the following manner:

The compressed air supplying the jack for displacement in the direction of the arrow 40 is admitted to the cylinder through the conduit 34 when the distributor 36 is operated. At the same time, the distributor 36 causes the conduit 35 to communicate with the open air and the air contained in the cylinder at the end 43 escapes to the exterior through the conduit 44 and the pipes 13 and 12 of the braking device, the conduit 35 and the distributor 36, which brings about displacement of the piston. As indicated hereinbefore, the body 1 of the packing element bearing against the seat 5 leaves open the passage towards the pipe 12.

When the piston arrives at the point 41 of its stroke, the cam 42 of the jack piston rod drives inwardly the push member 26, which causes the rim or valve member 2 of the packing element to bear against the seat 3 of the body 11 of the braking device, thus closing the passage through the pipe 12 and stopping the discharge from the cylinder to the open air through the distributor. But, in closing the passage 12, the valve member 1, whose rim 4 moves away from the seat 5, uncovers the central orifice 19 and the air evacuated from the cylinder then passes through the apertures 8 in the packing element, the central orifice 19 and the orifice 32 of the nipple containing the threaded needle valve. Now, the orifice whose section has been reduced by the threaded needle valve 29 sets up a resistance to the outflow of the air towards the exterior, and therefore creates in the cylinder 43 a counter-pressure which immediately retards the movement of the piston. It will be appreciated that it is possible to adjust the components of the braking device and the cross-section of the orifice 32 in such manner as to damp the remainder of the travel of the jack piston so as to obtain a stoppage without impact at the end of stroke.

It should be noted that the packing element is very stable in each of its two positions, on the one hand when it bears against the seat 5 by means of its elastic tension and the pressure of the supply or exhaust air which prevails in the direction in question, and on the other hand the said packing element is stable against the seat 3 after force has been applied by the push member 10, owing to the pressure of the exhaust air which prevails in the new direction, opposite to the previous direction.

Consequently a momentary engagement by the cam 42 of the member 46 is sufficient to cause rod 26 to unseat the portion 4 of the elastic valve from the seat 5 and cause the rim portion 2 to seat on seat 3. Once the valve member is unseated from seat 5 fluid flows from port 13 to the discharge port or passageway 14. In so flowing the exhaust pressure maintains the rim 2 seated on seat 3. Once the piston has completed its exhaust stroke the exhaust pressure drops and the valve member no longer having the exhaust pressure acting on it contracts and returns rim 4 to a seated position on seat 5. Accordingly port 12 is automatically uncovered and the reversing valve 36 is again placed in communication with cylinder 33 through conduit means 35 and 44.

By operating lever or handle 37 of reversing valve 36 in the proper direction fluid pressure is then applied through lines 35, the auxiliary control valve or braking device, and line 44 to reverse the direction of movement of piston 41. During the return travel of the piston 41 the cam 42 again momentarily actuates rod 26 but this does not impede the travel of the piston since the application of fluid pressure is interrupted only momentarily by the deflection of the elastic valve member. Once the cam 42 moves clear of member 46 the body portion 1 quickly takes its seated position on seat 5.

Moreover it will be understood that the braking or control device can be rendered effective to control the exhaust phase of a stroke of the piston by an arrangement whereby lever 45 or cam 42 is moved aside on the return stroke of the piston so that the rod 26 is not actuated on the return stroke and is only actuated when the piston is traveling in a given direction. In any event in the various embodiments of the invention the braking device is rendered effective to execute its exhaust control functions only when the piston is traveling in a given direction.

On the other hand it must be pointed out that the use of an elastic valve member has the advantage that the force which has to be exerted on the push member 26 to apply the valve member against the seat 3 is considerably reduced. This reduction in the force required is due to the fact that the valve member deforms readily under the action of the push member, and allows air to pass as soon as contact is interrupted at any one point between the rim 4 and its seat 5.

It should also be noted that the braking device according to the invention affords an economical and effective solution owing to the fact that it does not require metallic valve members, balls, or springs, which are known to have many disadvantages: jarring of the valve member and ball against their seat, causing deterioration of such parts and the risk of leakage, rusting of springs which then break, etc. This feature makes the present invention most advantageous.

I claim:

1. In a power apparatus having a cylinder, a piston reciprocable therein, a source of fluid under pressure including a reversing valve to control the application of fluid under pressure for operating the piston in both directions and for controlling the exhaust phase of the cycle in both directions of travel of the piston, conduit connections between said reversing valve and the cylinder and including an improvement which comprises an auxiliary control valve connected between the cylinder and the reversing valve for adjustably reducing the rate of fluid discharge from the cylinder to a predetermined level to adjustably control the exhaust phase of the piston operating cycle when the piston is traveling in a given direction and having an elastic valve member automatically effective to allow the application of reversing fluid pressure to said piston under control of said reversing valve when the exhaust phase controlled by said auxiliary control valve is completed, means defining a first fluid passageway terminating in two ports, said conduit connections connecting the two ports to the cylinder and the reversing valve respectively, means defining a second fluid passageway having communication with the first passageway and terminating in a third port, means to adjustably control fluid flow through said third port to atmosphere, said elastic valve member being disposed closing said second passageway and isolating it from the first passageway, and means operated by the piston comprising means for causing said elastic valve member to close the valve port connected to the reversing valve and for placing the first passageway in communication with the second passageway and its associated third port, said auxiliary control valve further comprising a valve body having an axial bore and said two ports having communication therewith, said means defining the second passageway comprising a frusto-conical hollow member disposed extending axially in the bore of said valve body and the interior thereof having communication with said third port, said frusto-conical member having a seat portion disposed radially spaced from the inner walls of the valve body bore and axially spaced from the valve body, said elastic valve member being cup-shaped and disposed circumferentially around said frusto-conical member and having its inner bottom surface seated against the seat portion of the frusto-conical member, the elastic valve member having a peripheral marginal portion at the mouth thereof stationarily fixed in a fluid-tight manner between the inner wall of the valve body and the frusto-conical member thereby to normally preclude fluid-flow from the bore to the interior of the frusto-conical member forming the second passageway, said piston operated means comprising an axially displaceable rod member disposed to momentarily engage the inner bottom surface of the elastic valve member and unseat it and to seat the outer bottom surface against the means defining the port connected to the reversing valve, and said elastic valve member having apertures on the walls thereof providing communication with the interior of the cup-shaped elastic valve member and the bore of the valve body, whereby when the elastic valve member is unseated fluid flows from the cylinder to the third port.

2. The power apparatus according to claim 1, in which said piston operated means further includes a lever mounted on the valve body and operable for displacing the rod member, and a variable-position cam actuated by the piston operably engaging the lever momentarily to selectively displace the rod member; the cam being constructed to engage the lever for a period of time less than it takes the piston to complete the exhaust phase of its stroke.

3. In a power apparatus having a cylinder, a piston reciprocable therein, a source of fluid under pressure including a reversing valve to control the application of fluid under pressure for operating the piston in both directions and for controlling the exhaust phase of the cycle in both directions of travel of the piston, conduit connections between said reversing valve and the cylinder and including an improvement which comprises an auxiliary control valve connected between the cylinder and the reversing valve for automatically reducing the rate of fluid discharge from the cylinder to a predetermined level to adjustably control the exhaust phase of the piston operating cycle when the piston is traveling in a given direction and automatically effective to allow the application of reversing fluid pressure to said piston under control of said reversing valve when the exhaust phase controlled by said auxiliary control valve is completed, said auxiliary control valve comprising a valve body defining a first chamber having a first opening providing communication between the cylinder and said chamber and having a first seat provided with a second opening to provide communication between the chamber and said reversing valve, means in said valve body defining a second chamber separate from the first chamber and having a second seat provided with a third opening providing communication between the first and second chambers, the first and second seats being disposed spaced from one another in said first chamber, an elastic, stretchable valve member having a peripheral marginal portion at the mouth thereof, said elastic valve member being disposed in the first chamber and having a fluid-impervious portion with opposite sides thereof seatable on said first and second seats said means defining the second chamber being disposed holding a peripheral edge portion of the elastic valve member in fixed position with said fluid-impervious portion seated on said second seat closing the third opening to said seat, said stretchable valve member having apertures disposed removed from said fluid-impervious portion and said peripheral edge portion to permit fluid-flow therethrough, means providing adjustable restricted fluid-flow out of the second chamber, and means operated by the piston when the piston reaches a preselected point in its path of travel when traveling in said given direction for unseating the valve member from said second seat and holding it seated on the first seat temporarily for rendering the auxiliary valve effective to reduce the rate of fluid discharge thereby to slow down the piston toward the ends of a stroke.

References Cited in the file of this patent

UNITED STATES PATENTS

| | | |
|---|---|---|
| 1,957,697 | Conway | May 8, 1934 |
| 2,063,414 | Tweddell | Dec. 8, 1936 |
| 2,541,464 | Davies | Feb. 13, 1951 |
| 2,547,861 | Fletcher | Apr. 3, 1951 |
| 2,556,698 | Loewe | June 12, 1951 |
| 2,753,849 | Becker | July 10, 1956 |

FOREIGN PATENTS

| | | |
|---|---|---|
| 524,729 | Great Britain | Aug. 13, 1940 |